(12) United States Patent
Lee et al.

(10) Patent No.: US 12,097,696 B2
(45) Date of Patent: Sep. 24, 2024

(54) FRINGE INFORMATION MEASURING APPARATUS AND SUBSTRATE TREATING SYSTEM INCLUDING THE SAME

(71) Applicant: SEMES CO., LTD., Chungcheongnam-do (KR)

(72) Inventors: Jae Duck Lee, Gyeonggi-do (KR); Han Lim Kang, Seoul (KR); Won Yong Jin, Jeollabuk-do (KR); Suk Won Jang, Gyeonggi-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 165 days.

(21) Appl. No.: 17/958,435

(22) Filed: Oct. 3, 2022

(65) Prior Publication Data
US 2023/0134959 A1 May 4, 2023

(30) Foreign Application Priority Data
Oct. 29, 2021 (KR) .......................... 10-2021-0147297

(51) Int. Cl.
*B41J 2/125* (2006.01)
*B41J 2/045* (2006.01)
*G01N 15/1434* (2024.01)

(52) U.S. Cl.
CPC ............. *B41J 2/125* (2013.01); *B41J 2/0454* (2013.01); *B41J 2/04561* (2013.01); *G01N 15/1436* (2013.01); *G01N 2015/1438* (2013.01); *G01N 2015/144* (2013.01)

(58) Field of Classification Search
CPC ................. B41J 2/125; G01N 15/1436; G01N 2015/1438; G01N 2015/144
See application file for complete search history.

(56) References Cited

U.S. PATENT DOCUMENTS

| | | | |
|---|---|---|---|
| 9,829,564 | B2 | 11/2017 | Bruder et al. |
| 9,989,623 | B2 | 6/2018 | Send et al. |
| 10,823,818 | B2 | 11/2020 | Send et al. |

(Continued)

FOREIGN PATENT DOCUMENTS

| | | | |
|---|---|---|---|
| CN | 210935500 U | * | 7/2020 |
| JP | 2014-219199 | | 11/2014 |

(Continued)

OTHER PUBLICATIONS

Notice of Allowance dated Nov. 27, 2023 for Korean Patent Application No. 10-2021-0147297 and its English translation from Global Dossier.

*Primary Examiner* — Sharon Polk
(74) *Attorney, Agent, or Firm* — Womble Bond Dickinson (US) LLP (57) ABSTRACT

Provided are a fringe information measuring apparatus that measures information on a fringe region using a temperature sensor array and a substrate treating system including the same. The fringe information measuring apparatus comprises: a laser sensor configured to output a first laser light and a second laser light to intersect each other; a thermal sensor array configured to pass through a fringe region formed by the intersection of the first laser light and the second laser light; and a control module configured to measure a position of the fringe region based on information obtained when the thermal sensor array passes through the fringe region.

20 Claims, 10 Drawing Sheets

(56) References Cited

U.S. PATENT DOCUMENTS

| | | |
|---|---|---|
| 10,845,459 B2 | 11/2020 | Bruder et al. |
| 11,161,337 B2 | 11/2021 | Kang et al. |
| 2011/0074855 A1* | 3/2011 | Casaldaliga ........... B41J 29/393 |
| | | 356/614 |
| 2018/0093501 A1* | 4/2018 | Knauf ................ G06K 15/1219 |

FOREIGN PATENT DOCUMENTS

| | | | |
|---|---|---|---|
| KR | 10-2004-0058365 | | 7/2004 |
| KR | 10-0959287 | | 5/2010 |
| KR | 101998965 | * | 3/2011 |
| KR | 10-2014-0138359 | | 12/2014 |
| KR | 10-2016-0019065 | | 2/2016 |
| KR | 10-2016-0148882 | | 12/2016 |
| KR | 2020-63954 | | 4/2020 |
| KR | 10-2021-0004381 | | 1/2021 |
| KR | 20210113462 A | * | 9/2021 |

* cited by examiner

FRINGE INFORMATION MEASURING APPARATUS AND SUBSTRATE TREATING SYSTEM INCLUDING THE SAME

CROSS-REFERENCE TO RELATED APPLICATION

This application claims priority from Korean Patent Application No. 10-2021-0147297 filed on Oct. 29, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a fringe information measuring apparatus and a substrate treating system including the same, and more particularly, to a fringe information measuring apparatus that can be applied to facilities for jetting droplets onto a substrate and a substrate treating system including the same.

2. Description of the Related Art

Whenever a printing process (e.g., RGB patterning) is performed on a transparent substrate to manufacture display devices such as an LCD panel, a PDP panel and an LED panel, printing equipment equipped with an inkjet head unit may be used.

SUMMARY

A phase doppler particle analyzer (PDPA) device is an instrument that measures the volume and speed of droplets jetted from a nozzle of an inkjet head unit using a laser. Such a PDPA device can measure the volume and speed of droplets when they pass through a fringe region formed by using a laser.

However, since both the size of the droplets and the size of the fringe region are very small, it is difficult to align the position of the nozzle so that the droplets pass through the fringe region.

Aspects of the present disclosure provide a fringe information measuring apparatus that measures information on a fringe region using a temperature sensor array and a substrate treating system including the same.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

Technical Solution

According to an aspect of the present disclosure, there is provided a fringe information measuring apparatus, comprising: a laser sensor configured to output a first laser light and a second laser light to intersect each other; a thermal sensor array configured to pass through a fringe region formed by the intersection of the first laser light and the second laser light; and a control module configured to measure a position of the fringe region based on information obtained when the thermal sensor array passes through the fringe region.

The thermal sensor array may include a plurality of thermal sensors disposed at regular intervals.

The control module may measure the position of the fringe region based on position information and temperature information of each thermal sensor.

The control module may measure the position of the fringe region based on the position information of the thermal sensor that measures a temperature higher than that of other thermal sensors.

The fringe information measuring apparatus further comprises a first camera sensor configured to photograph the thermal sensor array, and the control module may recognize the position information of each of the thermal sensors included in the thermal sensor array based on information obtained by photographing the thermal sensor array.

The control module may recognize the position information of each of the thermal sensors in real time whenever the thermal sensor array moves.

The control module may measure the position of the fringe region by moving the thermal sensor array, or measure the position of the fringe region by moving the fringe region.

The control module may further measure the size of the fringe region and the shape of the fringe region based on the information obtained when passing through the fringe region.

When measuring the size of the fringe region, the control module may estimate the size of the fringe region based on the size of thermal sensors that measure a temperature higher than that of other thermal sensors.

When measuring the shape of the fringe region, the control module may estimate the shape of the fringe region based on the shape of thermal sensors that measure a temperature higher than that of other thermal sensors.

The control module may determine whether or not the laser sensor is abnormal based on a change in a measured value of the thermal sensor array.

According to another aspect of the present disclosure, there is provided a substrate treating system, comprising: a process treating unit configured to support a substrate while treating the substrate; an inkjet head unit provided with a plurality of nozzles and configured to jet a substrate treatment solution onto the substrate using each of the nozzles; a gantry unit provided with the inkjet head unit and configured to move the inkjet head unit; a control unit configured to align positions of the plurality of nozzles; and a fringe information measuring apparatus configured to form a fringe region through which the substrate treatment solution passes and measure a position of the fringe region. The control unit aligns the positions of the plurality of nozzles based on the position of the fringe region.

The substrate treating system further comprises a second camera sensor configured to measure the positions of the plurality of nozzles, and the control unit aligns the positions of the plurality of nozzles based on the position of the fringe region when obtaining a measured value of the second camera sensor.

According to an aspect of the present disclosure, there is also provided a substrate treating system, comprising: a process treating unit configured to support a substrate while treating the substrate; an inkjet head unit provided with a plurality of nozzles and configured to jet a substrate treatment solution onto the substrate using each of the nozzles; a gantry unit provided with the inkjet head unit and configured to move the inkjet head unit; a control unit configured to align positions of the plurality of nozzles; and a fringe information measuring apparatus configured to form a fringe region through which the substrate treatment solution passes and measure a position of the fringe region. The fringe information measuring apparatus comprises: a laser sensor configured to output a first laser light and a second laser light to intersect each other; a thermal sensor array provided with a plurality of thermal sensors disposed at regular intervals and configured to pass through the fringe region formed by the intersection of the first laser light and the second laser light; and a control module configured to measure a position of the fringe region based on information obtained when the thermal sensor array passes through the fringe region. The control module measures the position of the fringe region based on position information and temperature information of each thermal sensor, and the control unit aligns the positions of the plurality of nozzles based on the position of the fringe region.

Specific details of other embodiments are included in the detailed description and the drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENT

Hereinafter, embodiments of the present disclosure will be described with reference to the attached drawings. The same or similar elements are assigned the same reference numerals irrespective of their reference numerals, and a redundant description thereof is omitted.

The present disclosure relates to a fringe information measuring apparatus that measures information on a fringe region (e.g., a position of the fringe region) using a temperature sensor array, and a substrate treating system including the same. According to the present disclosure, the position of a nozzle can be easily aligned so that droplets in micrometers pass through the fringe region in micrometers. Hereinafter, the present disclosure will be described in detail with reference to drawings.

Figure 1:
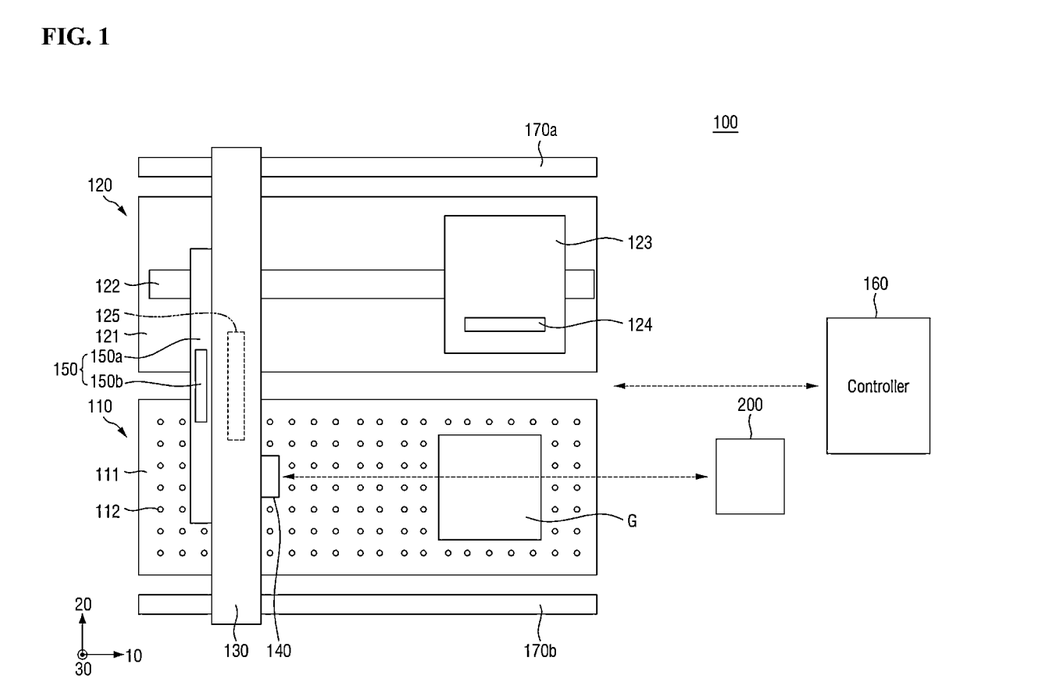
FIG. 1 is a conceptual diagram schematically illustrating a structure of a substrate treating system according to one embodiment of the present disclosure.

FIG. 1 is a conceptual diagram schematically illustrating a structure of a substrate treating system according to one embodiment of the present disclosure.

In the present disclosure, the fringe information measuring apparatus may measure information on the fringe region to measure the position of a nozzle installed in an inkjet head unit 140. To this end, the fringe information measuring apparatus may be provided in an inkjet facility configured to jet ink onto a substrate.

A substrate treating system 100 is meant to treat a substrate G (e.g., a glass substrate) used to manufacture a display device. This substrate treating system 100 can be implemented with the inkjet facility that jets a substrate treatment solution onto the substrate G using the inkjet head unit 140. Specifically, it can be implemented with a circulatory inkjet facility to prevent nozzles from being blocked by the substrate treatment solution. The substrate treating system 100 may be provided as, for instance, a quantum dot (QD) color filter (CF) inkjet facility.

According to FIG. 1, the substrate treating system 100 may include a process treating unit 110, a maintenance unit 120, a gantry unit 130, an inkjet head unit 140, a substrate treatment solution supply unit 150, a control unit 160, and a fringe information measuring apparatus 200.

The process treating unit 110 supports the substrate G while a PT operation is performed on the substrate G. The process treating unit 110 may support the substrate G using a non-contact way. The process treating unit 110 may support the substrate G by levitating the substrate G in the air using, for instance, air. However, the present embodiment is not limited thereto. The process treating unit 110 may support the substrate G using a contact way. The process treating unit 110 may support the substrate G using, for example, a support member having a settling surface formed on an upper part thereof.

Meanwhile, the PT operation refers to printing the substrate G using the substrate treatment solution, and the substrate treatment solution refers to a medical fluid used to print the substrate G. The substrate treatment solution may be, for example, quantum dot (QD) ink including ultrafine semiconductor particles.

The process treating unit 110 may include a first stage 111 and an air hole 112 when supporting the substrate G using air.

The first stage 111 serves as a base and is provided so that the substrate G may be settled on an upper part thereof. The air holes 112 may be formed by penetrating an upper surface of the first stage 111 and may be formed in a plural form in a PT zone on the first stage 111.

The air hole 112 may inject air in an upper direction 30 (i.e., a third direction) of the first stage 111. Through this, the air hole 112 may levitate the substrate G settled on the first stage 111 into the air.

Meanwhile, although not illustrated in FIG. 1, the process treating unit 110 may further include a gripper. The gripper is meant to prevent the substrate G from deviating from the first stage 111 when the substrate G moves along a longitudinal direction 10 (i.e., a first direction) of the first stage 111. The gripper may prevent the substrate G from deviating from the first stage 111 by gripping the substrate G and may slide along a guide rail (not shown) in a state of gripping the substrate G when the substrate G moves.

The maintenance unit 120 is meant to measure a position (i.e., a hitting point) where the substrate treatment solution is jetted on the substrate G and whether or not the substrate treatment solution is jetted. The maintenance unit 120 may measure the position of jetting the substrate treatment solution and whether or not the substrate treatment solution is jetted with regard to each of a plurality of nozzles included in the inkjet head unit 140, and allow the obtained measurement results to be supplied to the control unit 160.

The maintenance unit 120 may include, for example, a second stage 121, a third guide rail 122, a first plate 123, a calibration board 124, and a vision module 125.

Similarly to the first stage 111, the second stage 121 may serve as a base and be disposed in parallel with the first stage 111. The second stage 121 may be provided with the same size as the first stage 111; however, it can be provided with a size smaller or larger than that of the first stage 111. The second stage 121 may include an MT zone formed on an upper part thereof.

The third guide rail 122 guides a movement path of the first plate 123. The third guide rail 122 may be provided on the second stage 121 as at least one line along the longitudinal direction 10 (i.e., the first direction) of the second stage 121. The third guide rail 122 may be implemented with, for example, a linear motor (LM) guide system.

Meanwhile, although not illustrated in FIG. 1, the maintenance unit 120 may further include a fourth guide rail. Similarly to the third guide rail 122, the fourth guide rail may guide the movement path of the first plate 123 and be provided on the second stage 121 as at least one line along a width direction 20 (i.e., a second direction) of the second stage 121. Similarly to the third guide rail 122, the fourth guide rail may also be implemented with the LM guide system.

The first plate 123 moves on the second stage 121 along the third guide rail 122 and/or the fourth guide rail. The first plate 123 may move alongside the substrate G along the third guide rail 122 and may approach the substrate G or move away from the substrate G along the fourth guide rail.

The calibration board 124 is meant to measure a position of jetting the substrate treatment solution on the substrate G. The calibration board 124 may include an alignment mark and a graduated ruler and be installed on the first plate 123. The calibration board 124 may be provided along the longitudinal direction 10 (i.e., the first direction) of the first plate 123.

The vision module 125 is meant to acquire image information on the substrate G to measure the position of jetting the substrate treatment solution and whether or not the substrate treatment solution is jetted. The vision module 125 may include an area scan camera and a line scan camera and obtain the image information on the substrate G in real time. Meanwhile, the vision module 125 may obtain and provide information on the calibration board 124 as well as information on the substrate G on which the substrate treatment solution is jetted.

The vision module 125 may be provided on a side part or a lower part of the gantry unit 130 to photograph the substrate G. The vision module 125 may be installed, for example, in a form where it is attached to the side surface of the inkjet head unit 140. However, the present embodiment is not limited thereto. The vision module 125 may be provided on the first plate 123. Meanwhile, a plurality of vision modules 125 may be provided in the substrate treating system 100, and may be fixedly installed or movably installed therein.

The gantry unit 130 supports the inkjet head unit 140. The gantry unit 130 may be provided on upper parts of the first stage 111 and the second stage 121 so that the inkjet head unit 140 may jet the substrate treatment solution onto the substrate G.

The gantry unit 130 may be provided on the first stage 111 and the second stage 121 by considering the width direction 20 (i.e., the second direction) of the first stage 111 and the second stage 121 as the longitudinal direction. The gantry unit 130 may move along the first guide rail 170a and the second guide rail 170b in the longitudinal direction 10 (i.e., the first direction) of the first stage 111 and the second stage 121. Meanwhile, the first guide rail 170a and the second guide rail 170b may be provided outside the first stage 111 and the second stage 121 along the longitudinal direction 10 (i.e., the first direction) of the first stage 111 and the second stage 121.

Meanwhile, although not illustrated in FIG. 1, the substrate treating system 100 may further include a gantry movement unit. The gantry movement unit moves the gantry unit 130 along the first guide rail 170a and the second guide rail 170b. The gantry movement unit may be installed inside the gantry unit 130 and may include a first movement module (not shown) and a second movement module (not shown). The first movement module and the second movement module may be provided in both ends of the gantry unit 130 and may slide and move the gantry unit 130 along the first guide rail 170a and the second guide rail 170b.

The inkjet head unit 140 is meant to jet the substrate treatment solution in the form of droplets on the substrate G. The inkjet head unit 140 may be provided on the side part or the lower part of the gantry unit 130.

At least one inkjet head unit 140 may be installed in the gantry unit 130. When a plurality of inkjet head units 140 are installed in the gantry unit 130, the plurality of inkjet head units 140 may be arranged in a row along the longitudinal direction 20 (i.e., the second direction) of the gantry unit 130.

The inkjet head unit 140 may move along the longitudinal direction 20 (i.e., the second direction) of the gantry unit 130 to be disposed at a desired point on the substrate G. However, the present embodiment is not limited thereto. The inkjet head unit 140 may move along a height direction 30 (i.e., the third direction) of the gantry unit 130 and can rotate in a clockwise or counterclockwise direction.

Meanwhile, the inkjet head unit 140 may be fixed to the gantry unit 130. In that case, the gantry unit 130 may be movably provided.

Meanwhile, although not illustrated in FIG. 1, the substrate treating system 100 may further include an inkjet head movement unit. The inkjet head movement unit is meant to linearly move or rotate the inkjet head unit 140. When the substrate treating system 100 includes the plurality of inkjet head units 140, several inkjet head movement units may be provided in the substrate treating system 100 corresponding to the number of inkjet head units 140 to independently operate the plurality of inkjet head units 140. Meanwhile, a single inkjet head movement unit may be provided in the substrate treating system 100 to uniformly operate the plurality of inkjet head units 140.

Meanwhile, although not illustrated in FIG. 1, the inkjet head unit 140 may include a nozzle plate, a plurality of nozzles and a piezoelectric element. The nozzle plate constitutes a body of the inkjet head unit 140. The plurality of nozzles (e.g., 128 nozzles, 256 nozzles, etc.) may be provided in a lower part of the nozzle plate in multiple columns and rows at regular intervals, and the piezoelectric element may be provided in the nozzle plate, where the number of piezoelectric elements is equal to the number of nozzles. When the inkjet head unit 140 is configured in this way, the substrate treatment solution may be jetted onto the substrate G through the nozzle according to the operation of the piezoelectric element.

Meanwhile, the inkjet head unit 140 can independently adjust the jetting amount of the substrate treatment solution provided through each of the nozzles according to the voltage applied to the piezoelectric element.

A substrate treatment solution supply unit 150 is meant to supply ink to the inkjet head unit 140. The substrate treatment solution supply unit 150 may include a storage tank 150*a* and a pressure control module 150*b*.

The storage tank 150*a* is meant to store the substrate treatment solution, and the pressure control module 150*b* controls the internal pressure of the storage tank 150*a*. The storage tank 150*a* may supply an appropriate amount of substrate treatment solution to the inkjet head unit 140 based on the pressure supplied by the pressure control module 150*b*.

The control unit 160 is meant to perform maintenance for the inkjet head unit 140. Based on the measurement results of the maintenance unit 120, the control unit 160 may correct the position of jetting the substrate treatment solution of each of the nozzles included in the inkjet head unit 140 or detect defective nozzles (i.e., nozzles that do not jet the substrate treatment solution) among the plurality of nozzles, thus perform a cleaning task on the defective nozzles. To this end, the control unit 160 may control the operations of each component constituting the substrate treating system 100.

The control unit 160 may include a process controller, a control program, an input module, an output module (or a display module), and a memory module, and be implemented with a computer or a server. As described above, the process controller may include a microprocessor that executes control functions of each components constituting the substrate treating system 100, and a control program may execute different kinds of treatments of the substrate treating system 100 under the control of the process controller. The memory module stores a program for executing different kinds of treatments of the substrate treating system 100, i.e., a treating recipe, according to all kinds of data and treating conditions.

Meanwhile, as briefly described above, the substrate treating system 100 may include the fringe information measuring apparatus 200 to measure the information on the fringe region. Hereinafter, the fringe information measuring apparatus 200 will be described in detail.

In the substrate treating system 100 that jets the substrate treatment solution onto the substrate G using the nozzle of the inkjet head unit 140, when performing maintenance on the nozzle by measuring the volume and speed of the droplets, it is possible to minimize the occurrence of printing defects on the substrate G.

A phase doppler particle analyzer (PDPA) device is a measuring instrument that measures the volume and speed of the droplets using a laser. The PDPA device can significantly increase the measurement speed as compared to the case of using a vision-type drop watcher, thereby reducing the measurement time.

The PDPA device may form the fringe region using the laser and measure the volume and speed of the droplets when the droplets pass through the fringe region. The fringe region refers to a light pattern formed by intersecting two laser lights and merging them at one point.

However, the size of the droplets jetted from the nozzle of the inkjet head unit 140 has a diameter of approximately 20 $\mu m$ to 30 $\mu m$. In order to measure the volume and speed of the droplets, the droplets need to pass through the fringe region of the size of several tens of micrometers to several hundreds of micrometers. However, since both the size of the droplets and the size of the fringe region are small, it is difficult to align the position of the nozzle so that the droplets pass through the fringe region.

In addition, the fringe region generated by merging lasers of a few hundreds of mW is very difficult to directly observe with the eyes due to strong laser light, and since the fringe region has a high temperature, the inkjet head unit 140 may be damaged when it takes a long time to focus the nozzle.

The fringe information measuring apparatus 200 may measure the information on the fringe region using a thermal sensor array. The fringe information measuring device 200 can be used to quickly and accurately measure the position of the fringe region, thereby significantly reducing the time taken to focus the position of the nozzle. Moreover, using the fringe information measuring device 200, it is possible to measure a variety of information on the fringe region, such as the size and shape of the fringe region as well as the position of the fringe region.

Figure 2:
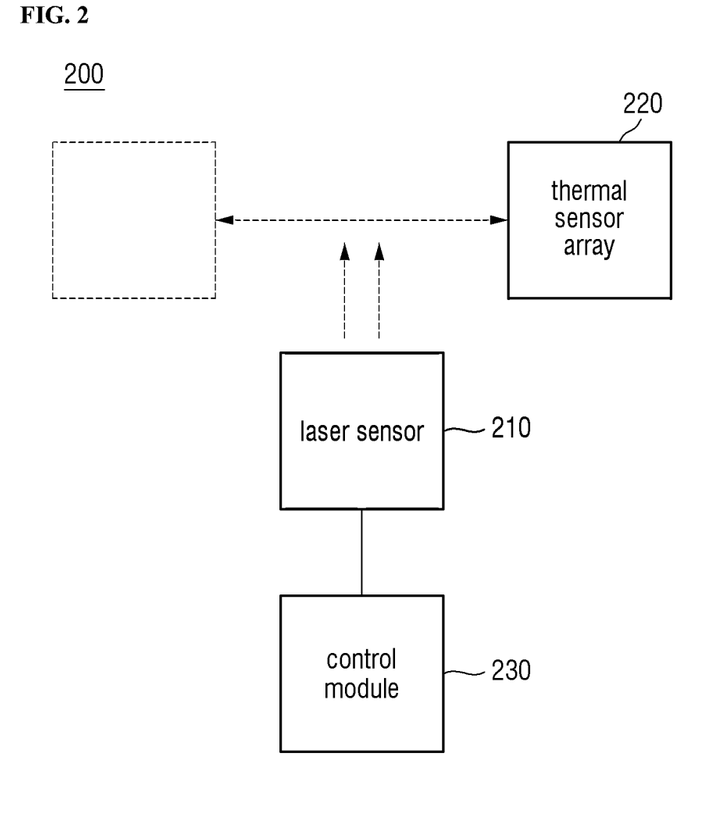
FIG. 2 is a first exemplary diagram schematically illustrating an internal configuration of a fringe information measuring apparatus constituting a substrate treating system according to one embodiment of the present disclosure.

FIG. 2 is a first exemplary diagram schematically illustrating an internal configuration of the fringe information measuring apparatus constituting the substrate treating system according to one embodiment of the present disclosure.

According to FIG. 2, the fringe information measuring apparatus 200 may include a laser sensor 210, a heat sensor array 220, and a control module 230.

The laser sensor 210 is meant to generate and output laser light. The laser sensor 210 may generate and output two laser lights, i.e., a first laser light and a second laser light. The laser sensor 210 may be provided as a PDPA device.

Figure 3:
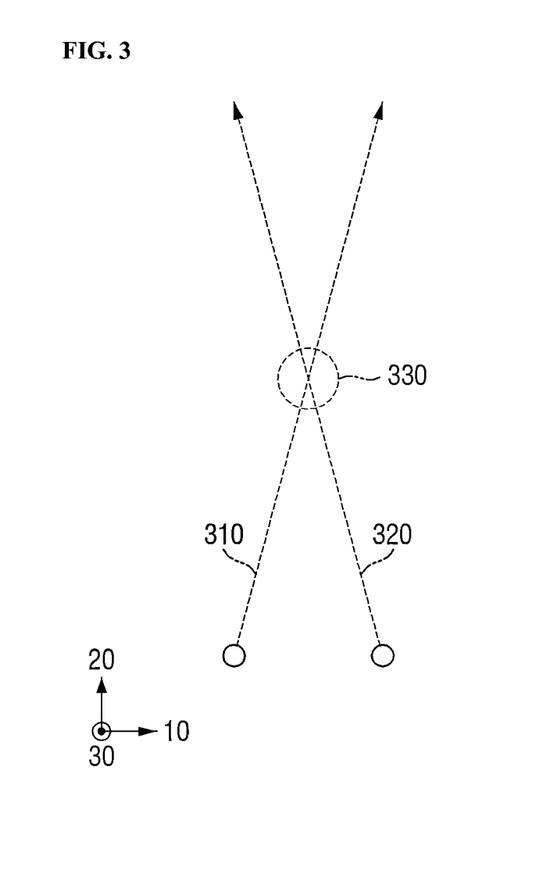
FIG. 3 is an exemplary diagram explaining a fringe region formed according to one embodiment of the present disclosure.

As illustrated in FIG. 3, the laser sensor 210 may output the first laser light 310 and the second laser light 320 so that the first laser light 310 and the second laser light 320 intersect at one point. A fringe region 330 may be formed in a point where the first laser light 310 and the second laser light 320 intersect. FIG. 3 is an exemplary diagram explaining a fringe region formed according to one embodiment of the present disclosure.

Figure 4:
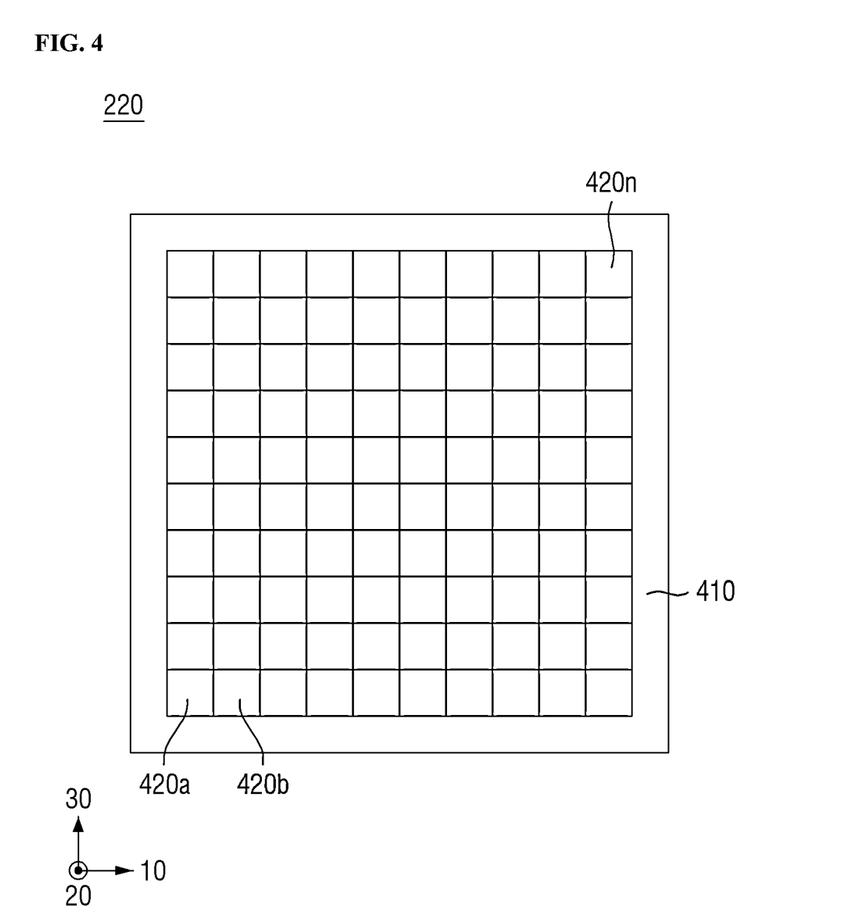
FIG. 4 is an exemplary diagram of a thermal sensor array included in the fringe information measuring apparatus according to one embodiment of the present disclosure.

In a thermal sensor array 220, a plurality of thermal sensors can be arranged in a plurality of directions. The thermal sensor array 220 may include, for example, a plurality of thermal sensors 420*a*, 420*b*, . . . , and 420*n* arranged in a lattice structure on a flat member 410 as illustrated in FIG. 4. FIG. 4 is an exemplary diagram of a thermal sensor array included in the fringe information measuring apparatus according to one embodiment of the present disclosure.

The thermal sensor may be, for instance, a sensor that measures a temperature. In that case, the heat sensor array 220 may be provided as a temperature sensor array formed by multi-arraying a small or ultra-small temperature sensor (e.g., a micrometer-sized temperature sensor).

Thermal sensors 420a, 420b, . . . , and 420n may be attached to a flat plate member 410 at regular intervals. In other words, the thermal sensing sensors 420a, 420b, . . . , and 420n may be attached to the flat plate member 410 at the same interval, and be thus coordinated. Accordingly, the thermal sensor array 220 can have such a structure, thereby identifying coordinate information x, y, and z.

Meanwhile, the measurement range of the thermal sensing sensors 420a, 420b, . . . , and 420n may vary according to specifications (e.g., a wavelength and power of the laser) of the PDPA device.

The control module 230 is meant to measure the information on the fringe region 330 formed by the laser sensor 210 using the thermal sensor array 220. The control module 230 may obtain the information on the fringe region 330, such as the position of the fringe region 330, the size of the fringe region 330, and the shape of the fringe region 330.

Figure 5:
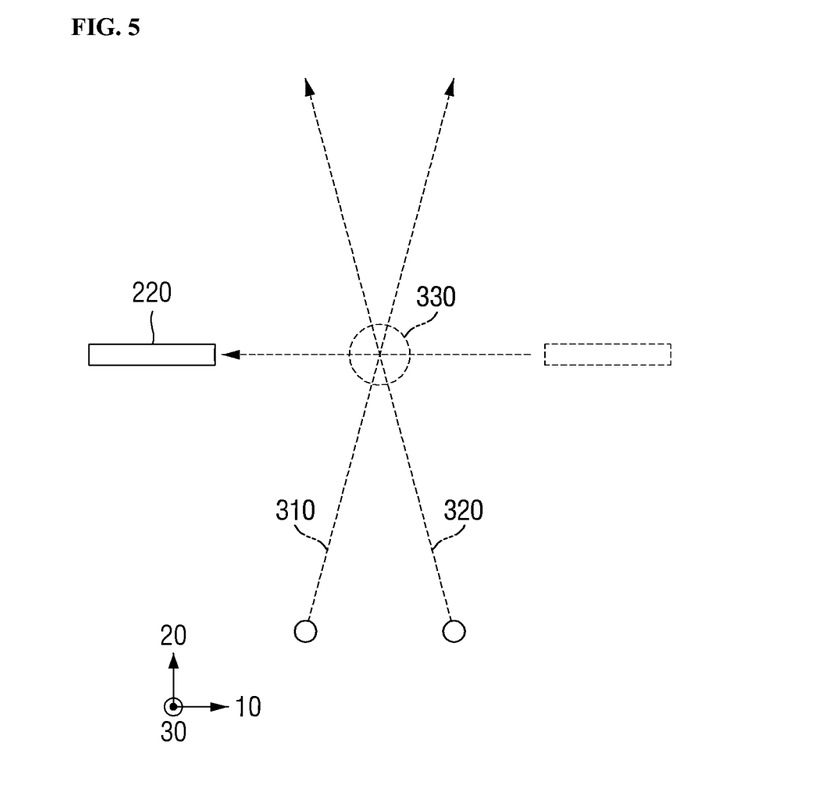
FIG. 5 is a first exemplary diagram explaining a method of measuring a position of the fringe region of the fringe information measuring apparatus constituting the substrate treating system according to one embodiment of the present disclosure.

The control module 230 may measure the information on the fringe region 330 by moving the thermal sensor array 220 in a direction in which the fringe region 330 is disposed. Specifically, when measuring the position of the fringe region 330, the control module 230 may measure the position of the fringe region 330 by allowing the thermal sensor array 220 to pass through the fringe region 330 as illustrated in FIG. 5. FIG. 5 is a first exemplary diagram explaining a method of measuring a position of the fringe region of the fringe information measuring apparatus constituting the substrate treating system according to one embodiment of the present disclosure.

The fringe region 330 formed at a point where the first laser light 310 and the second laser light 320 intersect has a relatively higher temperature than other regions. Accordingly, in the present embodiment, the position of the fringe region 330 may be measured by allowing the thermal sensor array 220 where the plurality of thermal sensing sensors 420a, 420b, . . . , and 420n are multi-arrayed to pass through the fringe region 330.

The control module 230 hash recognized the position information on each of the thermal sensors 420a, 420b, . . . , and 420n, which constitute the thermal sensor array 220. In addition, each of the thermal sensors 420a, 420b, . . . , and 420n may measure the temperature in real time, and the temperature measured at this time may be provide to the control module 230.

When the thermal sensor array 220 passes through the fringe region 330, a relatively higher temperature may be measured in the plurality of thermal sensor arrays formed along a line among the plurality of thermal sensors 420a, 420b, . . . , and 420n constituting the thermal sensor array 220. When the thermal sensor array 220 passes through the fringe region 330 in the horizontal direction with respect to the ground, a relatively higher temperature may be measured from the thermal sensors on a line formed in a row in the horizontal direction 10 (i.e., the first direction). Alternatively, when the thermal sensor array 220 passes through the fringe region 330 in the direction perpendicular to the ground, a relatively higher temperature may be measured from the thermal sensors on a line formed in row in the vertical direction 30 (i.e., the third direction). Alternatively, when the thermal sensor array 220 passes through the fringe region 330 diagonally with respect to the ground, a relatively higher temperature may be measured in the thermal sensors on a line formed diagonally in a row.

Figure 6:
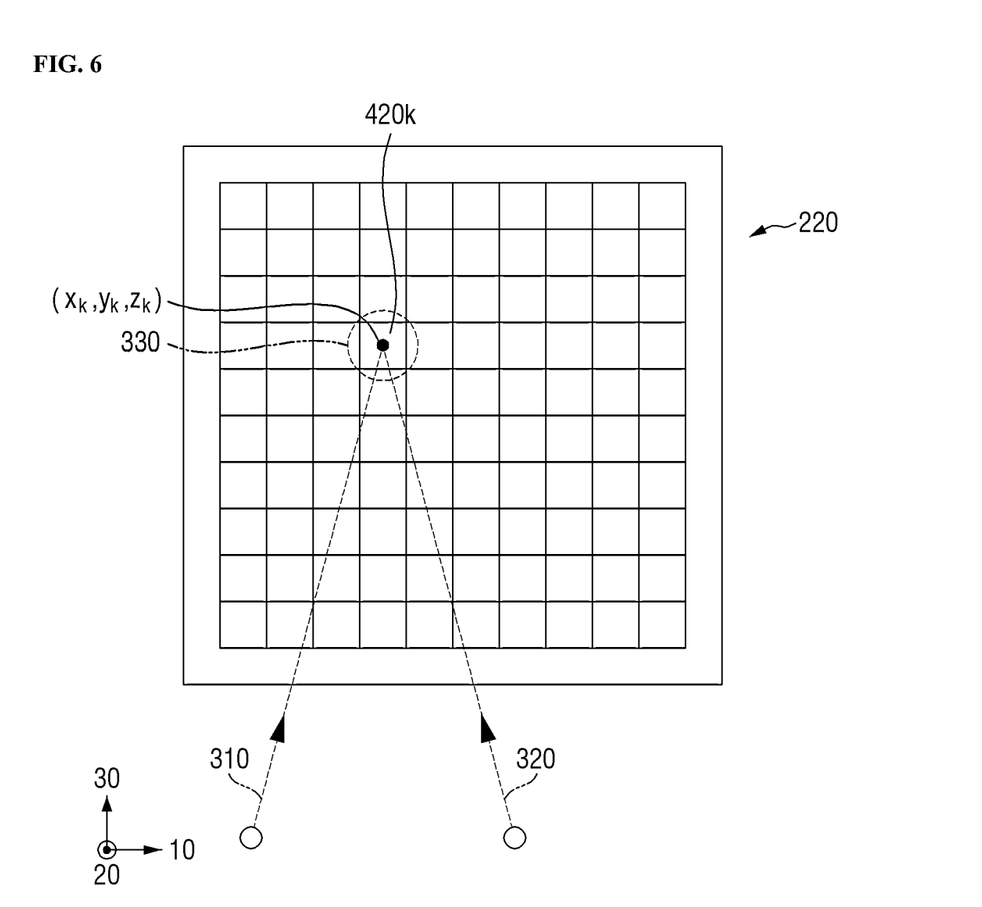
FIG. 6 is a second exemplary diagram explaining the method of measuring the position of the fringe region of the fringe information measuring apparatus constituting the substrate treating system according to one embodiment of the present disclosure.

For example, as illustrated in FIG. 6, when a relatively higher temperature is measured from a thermal sensor 420k on a line than other sensors among the plurality of thermal sensors 420a, 420b, . . . , and 420n constituting the thermal sensor array 220, the corresponding thermal sensor 420k can be disposed in the center point of the fringe region 330. Accordingly, the control module 230 may recognize the position information $x_k$, $y_k$, and $z_k$ of the corresponding thermal sensor 420k and measure the same as the position of the fringe region 330. FIG. 6 is a second exemplary diagram explaining the method of measuring the position of the fringe region of the fringe information measuring apparatus constituting the substrate treating system according to one embodiment of the present disclosure.

As described above, in order to measure the position of the fringe region 330 using the thermal sensor array 220, the control module 230 has to receive the information on the temperature measured in real time from each of the thermal sensor 420a, 420b, . . . , and 420n, and recognize the position information on each of the thermal sensing sensors 420a, 420b, and 420n.

In the present embodiment, the control module 230 can previously recognize the position information on each of the thermal sensors 420a, 420b, . . . , and 420n. In that case, the region in which the thermal sensor array 220 can move is limited, and the control module 230 can previously measure and recognize the information on each of the thermal sensors 420a, 420b, and 420n within the movement area.

Figure 7:
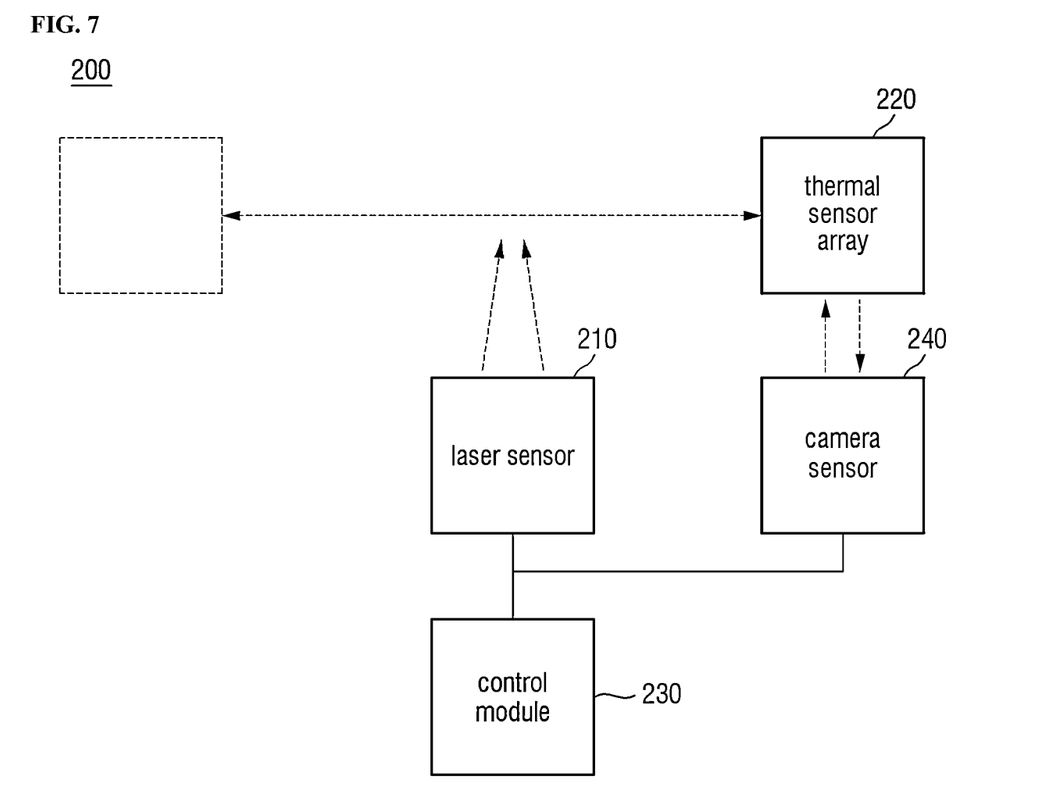
FIG. 7 is a second exemplary diagram schematically illustrating an internal configuration of the fringe information measuring apparatus constituting the substrate treating system according to one embodiment of the present disclosure.

The position information on each of the thermal sensing sensors 420a, 420b, . . . , and 420n may be measured in real time, and the position information measured at this time may be provided to the control module 230. Taking into account this aspect, the fringe information measuring apparatus 200 may further include a camera sensor 240 as illustrated in FIG. 7. FIG. 7 is a second exemplary diagram schematically illustrating an internal configuration of the fringe information measuring apparatus constituting the substrate treating system according to one embodiment of the present disclosure.

The camera sensor 240 may photograph the thermal sensor array 220. The control module 230 may recognize the position information for each of the thermal sensors 420a, 420b, . . . , and 420n constituting the thermal sensor array 220 based on image information obtained by the camera sensor 240.

As described above, the thermal sensor array 220 may pass through the fringe region 330 to measure the position of the fringe region 330. Accordingly, when the thermal sensor array 220 moves, the camera sensor 240 can photograph the thermal sensor array 220 in real time, and the control module 230 can recognize the position information of each of the thermal sensors 420a, 420b, . . . , and 420n in real time.

The method of measuring the position of the fringe region 330 using the thermal sensor array 220 has been described above with reference to FIGS. 5 and 6. In the present embodiment, not only the position of the fringe region 330 but also the size of the fringe region 330 and the shape of the fringe region 330 may be measured using the thermal sensor array 220.

Figure 8:
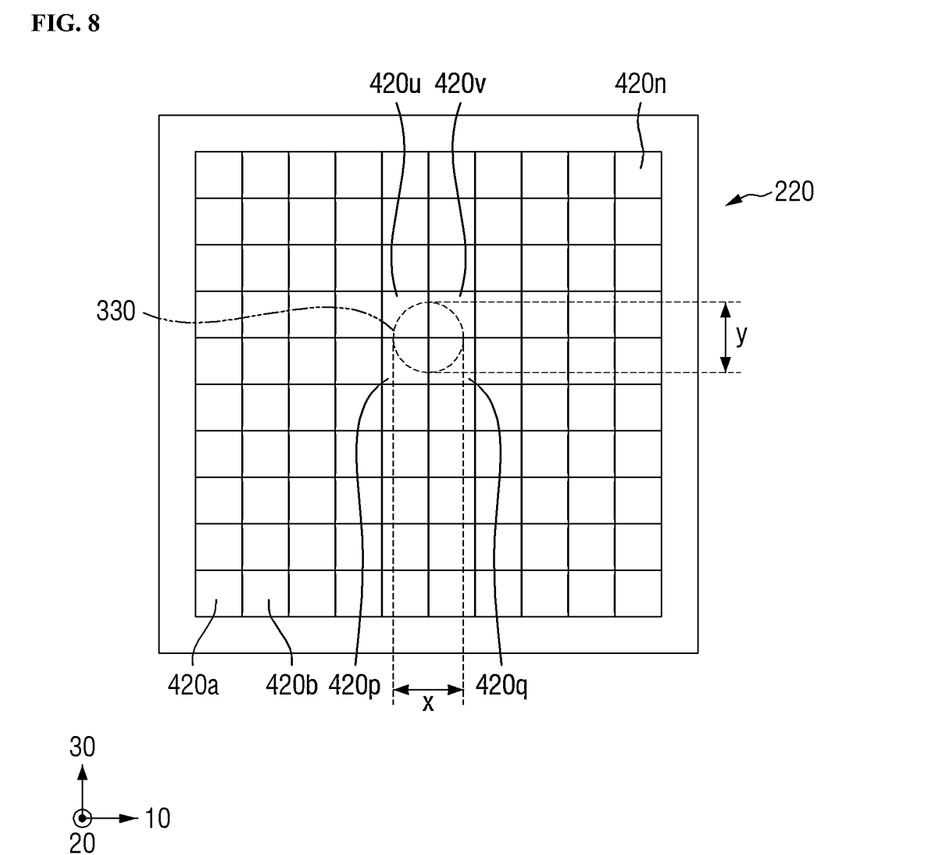
FIG. 8 is a first exemplary diagram explaining a method of measuring the size of the fringe region of the fringe information measuring apparatus constituting the substrate treating system according to one embodiment of the present disclosure.

For example, in the case of the size of the fringe region 330, when a relatively higher temperature is measured in four thermal sensors 420p, 420q, 420u and 420v than the average temperature of all the thermal sensors 420a, 420b, . . . , and 420n constituting the thermal sensor array 220, as illustrated in FIG. 8, the control module 230 can estimate the size (x*y) of the fringe region 330 based on the size obtained by merging the four thermal sensors 420p, 420q, 420u and 420v. FIG. 8 is a first exemplary diagram explaining a method of measuring the size of the fringe region of the fringe information measuring apparatus constituting the substrate treating system according to one embodiment of the present disclosure.

Figure 9:
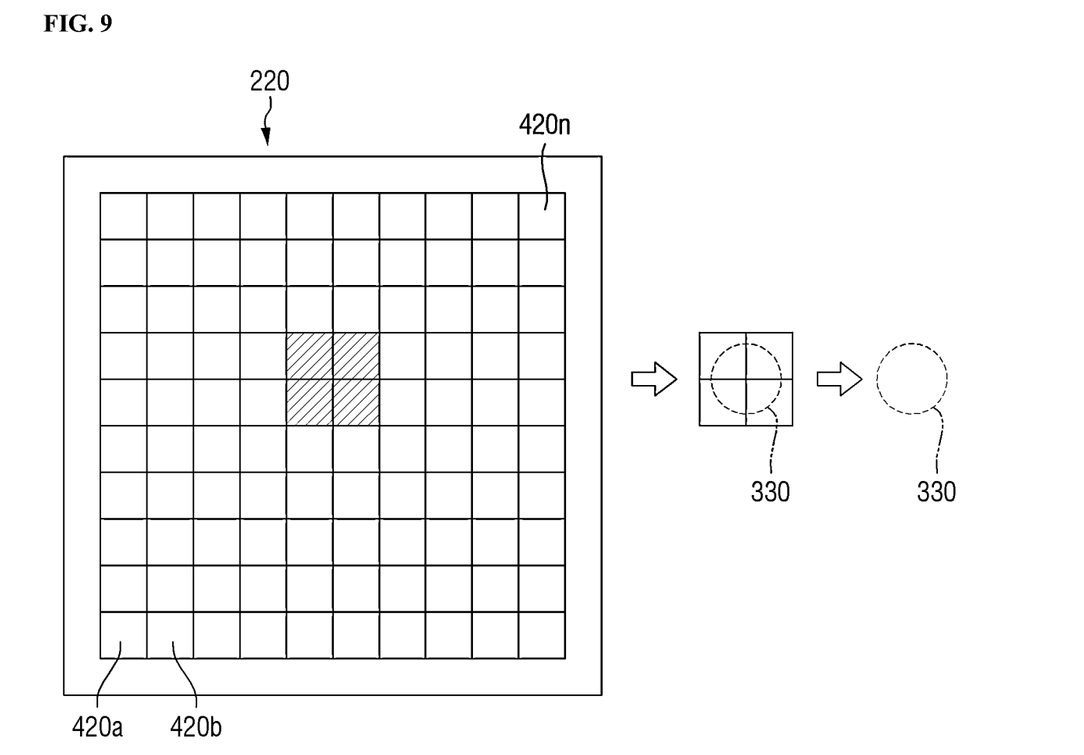
FIG. 9 is a first exemplary diagram explaining a method of measuring the shape of the fringe region of the fringe information measuring apparatus constituting the substrate treating system according to one embodiment of the present disclosure.
Figure 10:
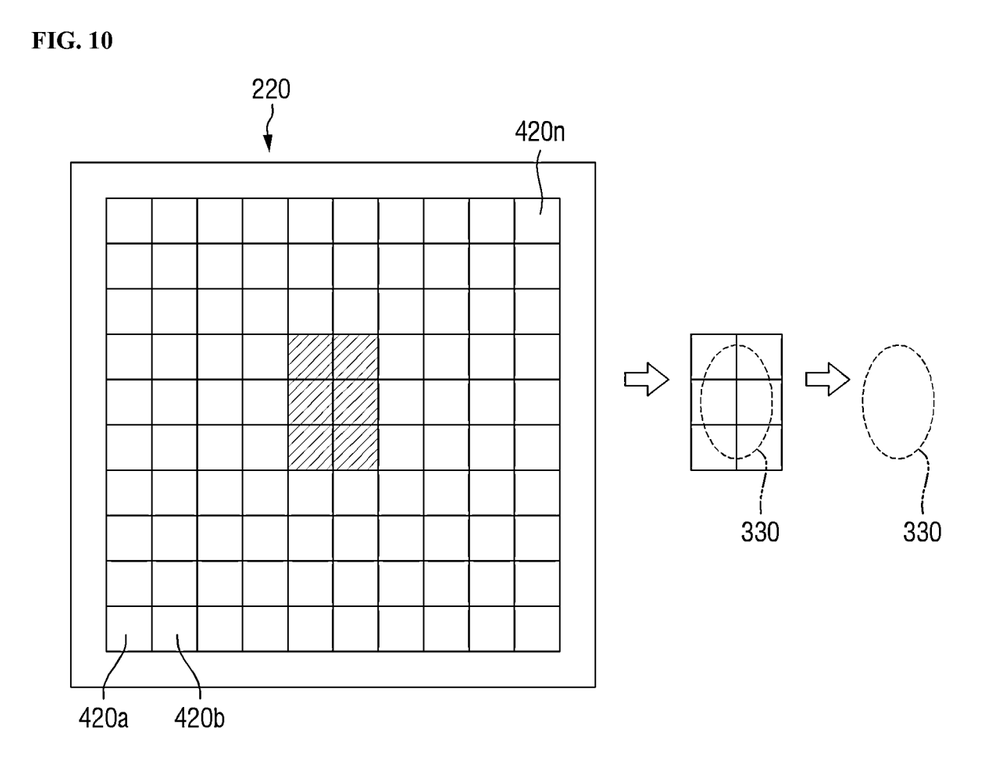
FIG. 10 is a second exemplary diagram explaining the method of measuring the shape of the fringe region of the fringe information measuring apparatus constituting the substrate treating system according to one embodiment of the present disclosure.

Furthermore, for example, in the case of the shape of the fringe region 330, as illustrated in FIGS. 9 and 10, it is possible to estimate whether or not the shape of the fringe region 330 is circular or elliptical based on thermal sensors that measure temperatures relatively higher than the average temperature of all the thermal sensors 420a, 420b, . . . , and 420n.

As described above, FIG. 9 is an example in which the shape of the fringe region 330 is estimated to be circular, and FIG. 10 is an example in which the shape of the fringe region 330 is estimated to be elliptical. FIG. 9 is a first exemplary diagram explaining a method of measuring the shape of the fringe region of the fringe information measuring apparatus constituting the substrate treating system according to one embodiment of the present disclosure, and FIG. 10 is a second exemplary diagram explaining the method of measuring the shape of the fringe region of the fringe information measuring apparatus constituting the substrate treating system according to one embodiment of the present disclosure.

However, in the aforementioned description, the position, size, and shape of the fringe region 330 are measured by moving the thermal sensor array 220, but the present embodiment is not limited thereto, and the position, size, and shape of the fringe region 330 can be measured by fixing the position of the thermal sensor array 200 and moving the position of the fringe region 220. In that case, when previously measuring the position information on each of the thermal sensors 420a, 420b, . . . , and 420n constituting the thermal sensor array 220, the fringe information measuring apparatus 200 may not include the camera sensor 240.

Meanwhile, when at least one of the two or more lasers of the PDPA device changes, the measured value of the thermal sensor (e.g., the measured temperature in the case of the temperature sensor) may vary. For example, when there is the problem with at least one of the two lasers, the fringe region 330 formed by the two lasers may not be formed, or the temperature measured in the fringe region 330 will be measured lower than a previously known temperature. In the present disclosure, in that case, the PDPA device is considered to have been abnormal, and it can be confirmed whether or not the PDPA device is abnormal.

Meanwhile, in the present disclosure, it is also possible to measure the size and shape of the fringe region 330 and use the same to determine whether or not the PDPA device is abnormal. When there is the problem with at least one of the two lasers, the fringe region 330 formed by the two lasers will not be formed, or the size or shape of the fringe region 330 will be different from a previously known size or shape. Accordingly, it can be determined whether or not the PDPA device is abnormal.

Meanwhile, although not illustrated in FIGS. 2 and 7, the fringe information measuring apparatus 200 may further include a power module. The power module may serve to supply power to each component constituting the fringe information measuring apparatus 200.

Meanwhile, although not illustrated in FIG. 1, the substrate treating system 100 may further include a camera sensor to align the position of the nozzle constituting the inkjet head unit 140 based on the position of the fringe region 330 measured by the fringe information measuring apparatus 200.

Hereinafter, the camera sensor 240 described with reference to FIG. 7 is defined as a first camera sensor, and the camera sensor described herein is defined as a second camera sensor, and these two camera sensors will be distinguished from each other.

The second camera sensor measures position information on each nozzle provided in the inkjet head unit 140. When the second camera sensor photographs the nozzle of the inkjet head unit 140 and provides the image information to the control unit 160, the control unit 160 may analyze the image information to realize the position of the nozzle.

When the position of the nozzle is recognized based on the information obtained by the second camera sensor, the control unit 160 may align the position of the nozzle using the position information of the fringe region 330 measured by the fringe information measuring apparatus 200. Accordingly, in the present disclosure, the volume and speed of the droplets can be analyzed within a short period of time by allowing the droplets jetted by the nozzle accurately to pass through the fringe region 330.

In order to measure the droplets jetted from the nozzle of the inkjet head unit 140, the droplets need to pass through the fringe region 330 formed by two laser lights (i.e., the first laser light 310 and the second laser light 320. To this end, the position of the nozzle and the position of the fringe region 330 have to be aligned, and, since the size of the droplets and the size of the fringe region 330 are very small, performing this task may be time-consuming.

When the plurality of thermal sensors 420a, 420b, . . . , and 420n for aligning the positions between the nozzle and the fringe region 330 use the thermal sensor array 220 arranged in a lattice structure, the position of the fringe region 330 can be coordinated so as to reduce the alignment time from several hours to less than several minutes. As described above, the position of the nozzle may be easily obtained from coordinates by the image obtaining method using the second camera sensor, but it is impossible to directly coordinate the position of the fringe region 330.

In the present disclosure, by multi-arraying micrometer-sized thermal sensing sensors 420a, 420b, . . . , and 420n, the temperature can be analyzed when they pass through the fringe region 330, thereby accurately obtaining the position of the fringe region 330.

Meanwhile, in the present disclosure, it is also possible for the first camera sensor to perform the role of the second camera sensor instead.

The fringe information measuring apparatus 200 and the substrate treating system 100 including the same have been described above with reference to FIGS. 1 to 10. The fringe information measuring device 200 is a laser fringe coordinate acquisition system that can obtain information such as the laser position (x, y, z), size and shape of the laser of the PDPA device using the thermal sensor (e.g., a temperature sensor). When the PDPA device or the thermal sensor moves and the fringe region simultaneously irradiates the thermal sensor, the position, size, and shape of the fringe region can be identified using the coordinates and temperature data of the measured sensor.

When the thermal sensors 420a, 420b, . . . , and 420n move and passes through the fringe region 330, a position where the temperature reaches its maximum point is a position of a center point of the fringe region 330. Accordingly, in the present disclosure, the thermal sensor array 220 can be allowed to pass through the fringe region 330, thereby confirming the information on the position, size, and shape of the fringe region 330. When using the PDPA device in the inkjet facility, it is possible to improve the measurement accuracy by identifying the position and size of the fringe region 330, which has previously been problematic using the aforementioned method.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. A fringe information measuring apparatus, comprising:
   a laser sensor configured to output a first laser light and a second laser light to intersect each other;
   a thermal sensor array configured to pass through a fringe region formed by the intersection of the first laser light and the second laser light; and
   a control module configured to measure a position of the fringe region based on information obtained when the thermal sensor array passes through the fringe region.

2. The fringe information measuring apparatus of claim 1, wherein the thermal sensor array includes a plurality of thermal sensors disposed at regular intervals.

3. The fringe information measuring apparatus of claim 2, wherein the control module measures the position of the fringe region based on position information and temperature information of each thermal sensor.

4. The fringe information measuring apparatus of claim 3, wherein the control module measures the position of the fringe region based on position information of the thermal sensor that measures a temperature higher than that of other thermal sensors.

5. The fringe information measuring apparatus of claim 1, comprising a first camera sensor configured to photograph the thermal sensor array,
   wherein the control module recognizes the position information of each of the thermal sensors included in the thermal sensor array based on information obtained by photographing the thermal sensor array.

6. The fringe information measuring apparatus of claim 5, wherein the control module recognizes the position information of each of the thermal sensors in real time whenever the thermal sensor array moves.

7. The fringe information measuring apparatus of claim 1, wherein the control module measures the position of the fringe region by moving the thermal sensor array, or measures the position of the fringe region by moving the fringe region.

8. The fringe information measuring apparatus of claim 1, wherein the control module further measures the size of the fringe region and the shape of the fringe region based on the information obtained when passing through the fringe region.

9. The fringe information measuring apparatus of claim 8, wherein when measuring the size of the fringe region, the control module estimates the size of the fringe region based on the size of thermal sensors that measure a temperature higher than that of other thermal sensors.

10. The fringe information measuring apparatus of claim 8, wherein when measuring the shape of the fringe region, the control module estimates the shape of the fringe region based on the shape of thermal sensors that measure a temperature higher than that of other thermal sensors.

11. The fringe information measuring apparatus of claim 1, wherein the control module determines whether or not the laser sensor is abnormal based on a change in a measured value of the thermal sensor array.

12. A substrate treating system, comprising:
    a process treating unit configured to support a substrate while treating the substrate;
    an inkjet head unit provided with a plurality of nozzles and configured to jet a substrate treatment solution onto the substrate using each of the nozzles;
    a gantry unit provided with the inkjet head unit and configured to move the inkjet head unit;
    a control unit configured to align positions of the plurality of nozzles; and
    a fringe information measuring apparatus configured to form a fringe region through which the substrate treatment solution passes and measure a position of the fringe region,
    wherein the control unit aligns the positions of the plurality of nozzles based on the position of the fringe region.

13. The substrate treating system of claim 12, further comprising a second camera sensor configured to measure the positions of the plurality of nozzles,
    wherein the control unit aligns the positions of the plurality of nozzles based on the position of the fringe region when obtaining a measured value of the second camera sensor.

14. The substrate treating system of claim 12, wherein the fringe information measuring apparatus comprises:
    a laser sensor configured to output a first laser light and a second laser light to intersect each other;
    a thermal sensor array configured to pass through a fringe region formed by the intersection of the first laser light and the second laser light; and
    a control module configured to measure the position of the fringe region based on the information obtained when the thermal sensor array passes through the fringe region.

15. The substrate treating system of claim 14, wherein the thermal sensor array includes a plurality of thermal sensors disposed at regular intervals, and
    the control module measures the position of the fringe region based on position information and temperature information of each thermal sensor.

16. The substrate treating system of claim 15, wherein the control module measures the position of the fringe region based on position information of the thermal sensor that measures a temperature higher than that of other thermal sensors.

17. The substrate treating system of claim 14, wherein the fringe information measuring apparatus further comprises:
    a first camera sensor configured to photograph the thermal sensor array,
    wherein the control module recognizes position information of each thermal sensor included in the thermal sensor array based on information obtained by photographing the thermal sensor array, wherein whenever the thermal sensor array moves, the position information of each thermal sensor is recognized in real time.

18. The substrate treating system of claim 14, wherein the control module measures the position of the fringe region by moving the thermal sensor array, or measures the position of the fringe region by moving the fringe region.

19. The substrate treating system of claim 14, wherein the control module further measures the size of the fringe region and the shape of the fringe region based on the information obtained when passing through the fringe region.

20. A substrate treating system, comprising:
- a process treating unit configured to support a substrate while treating the substrate;
- an inkjet head unit provided with a plurality of nozzles and configured to jet a substrate treatment solution onto the substrate using each of the nozzles;
- a gantry unit provided with the inkjet head unit and configured to move the inkjet head unit;
- a control unit configured to align positions of the plurality of nozzles; and
- a fringe information measuring apparatus configured to form a fringe region through which the substrate treatment solution passes and measure a position of the fringe region, wherein the fringe information measuring apparatus comprises:
- a laser sensor configured to output a first laser light and a second laser light to intersect each other;
- a thermal sensor array provided with a plurality of thermal sensors disposed at regular intervals and configured to pass through the fringe region formed by the intersection of the first laser light and the second laser light; and
- a control module configured to measure the position of the fringe region based on the information obtained when the thermal sensor array passes through the fringe region wherein the control module measures the position of the fringe region based on position information and temperature information of each thermal sensor, and the control unit aligns the positions of the plurality of nozzles based on the position of the fringe region.

* * * * *